Figure 9:
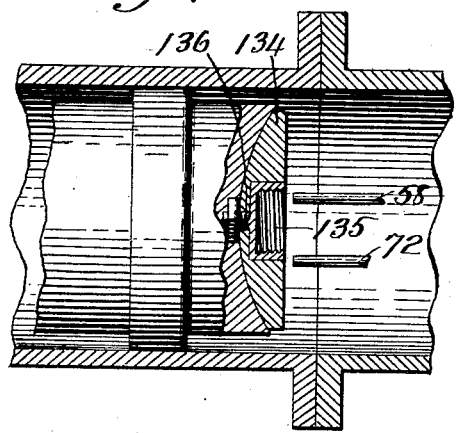

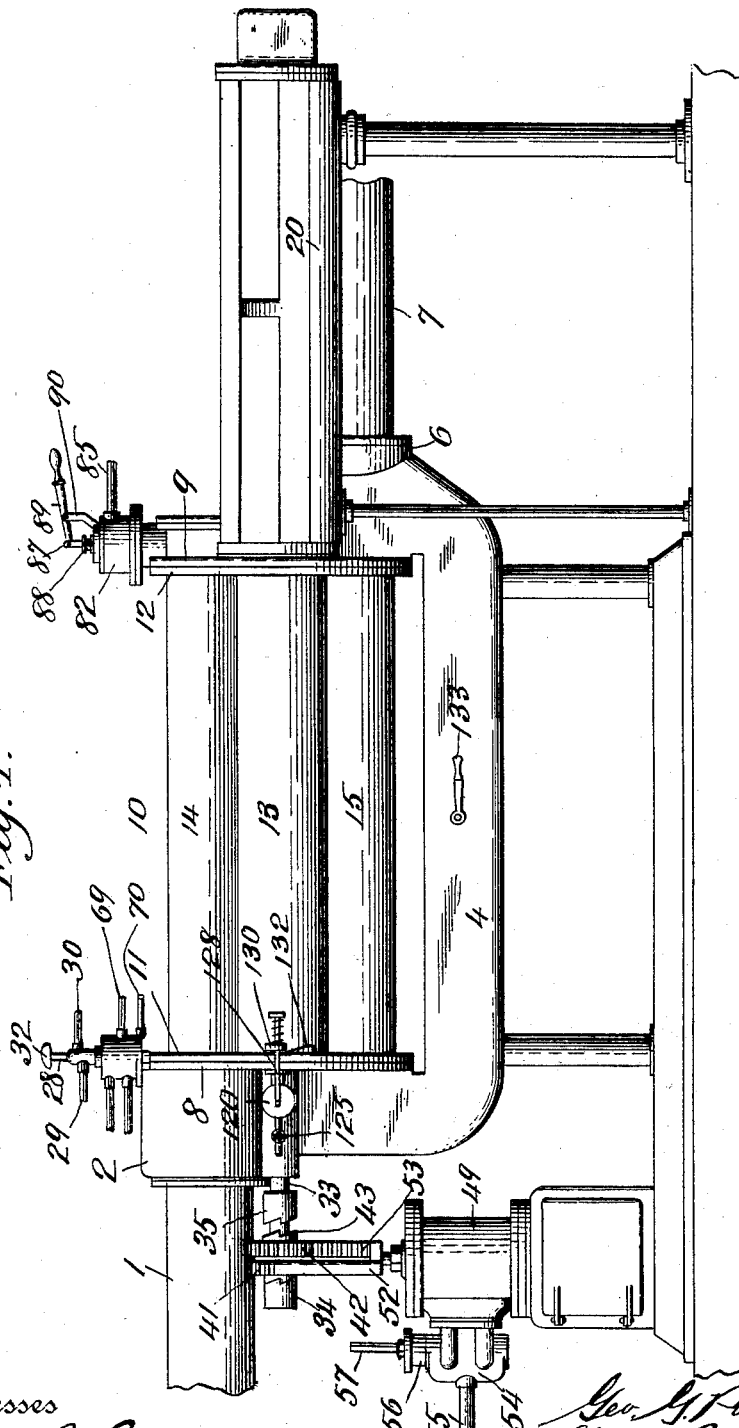

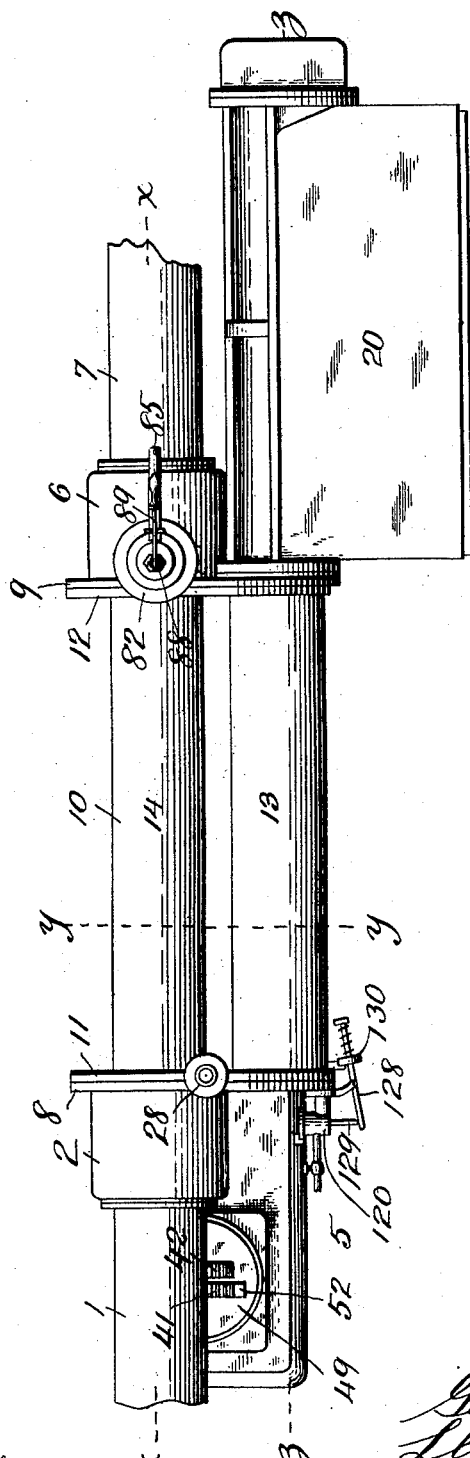

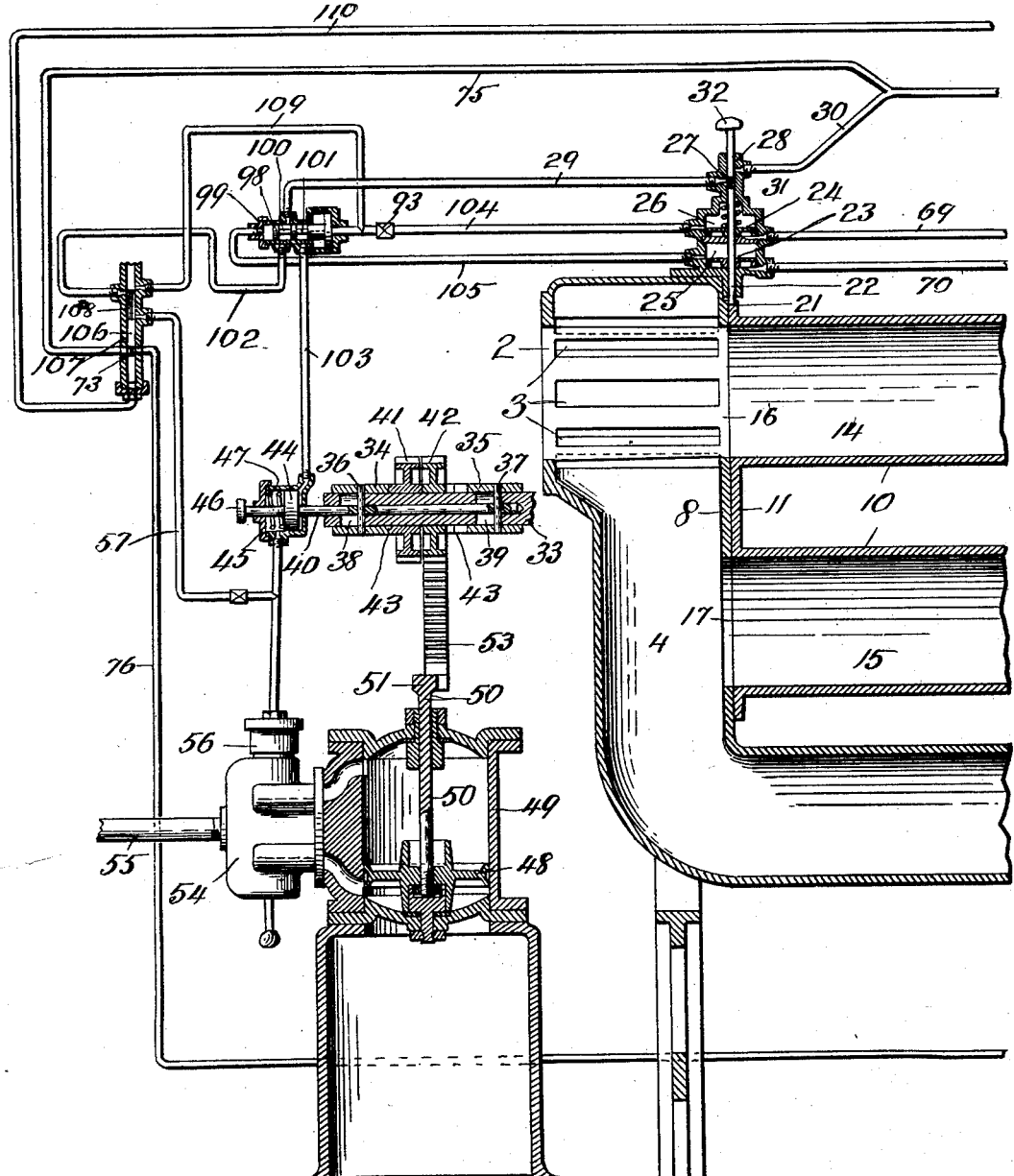

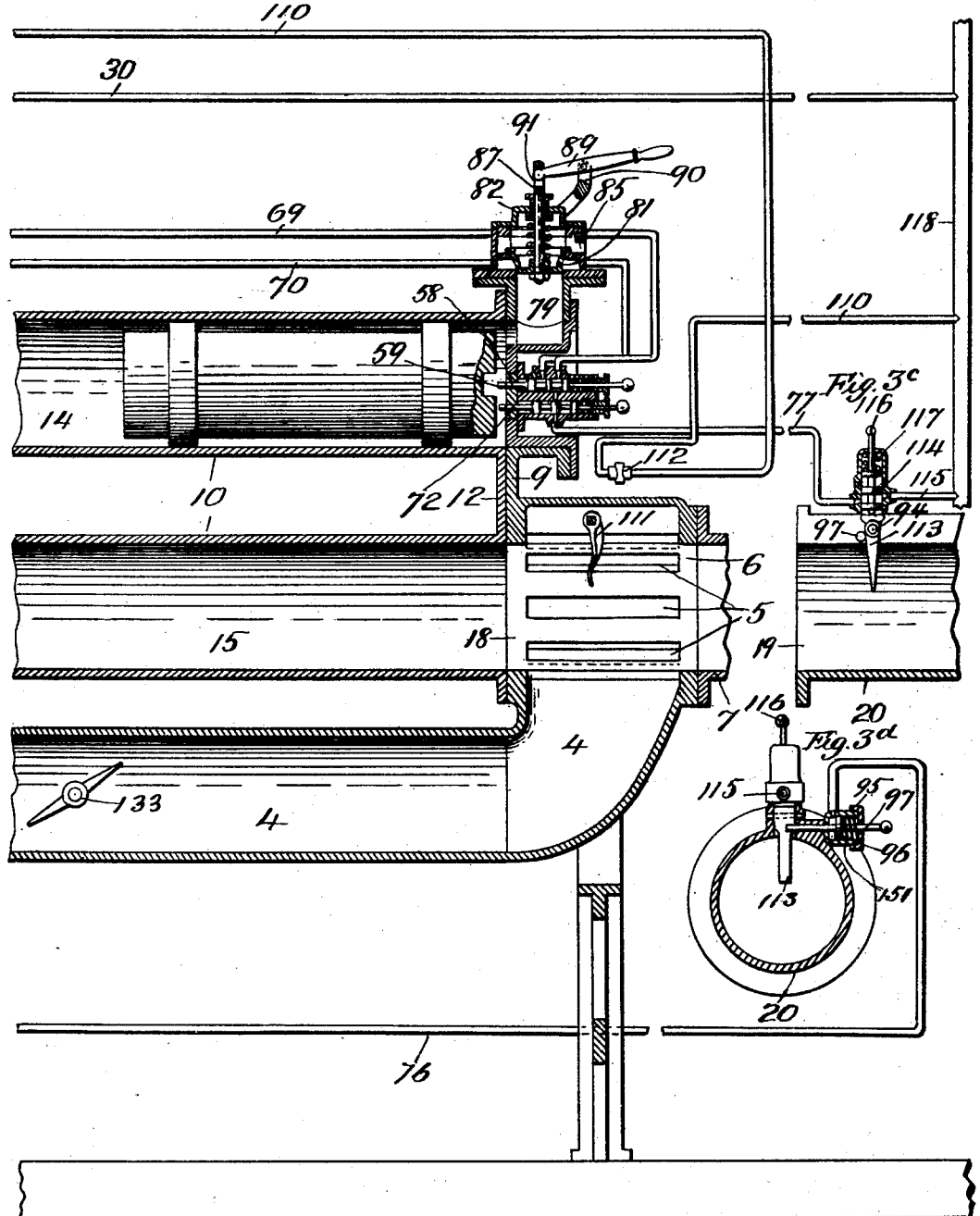

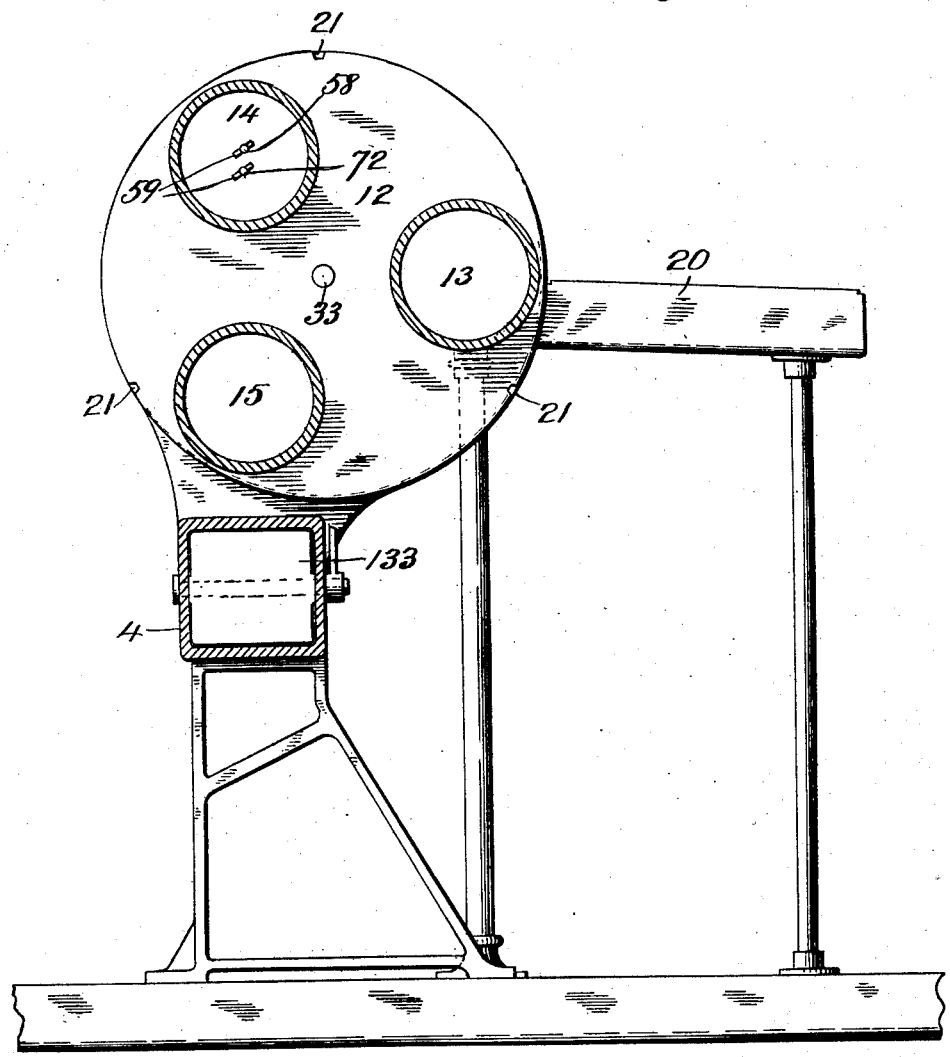

No. 714,865. Patented Dec. 2, 1902.
L. COLLIS & G. G. POWELL.
TUBULAR DESPATCH SYSTEM.
(Application filed Aug. 28, 1901.)
(No Model.) 8 Sheets—Sheet 6.
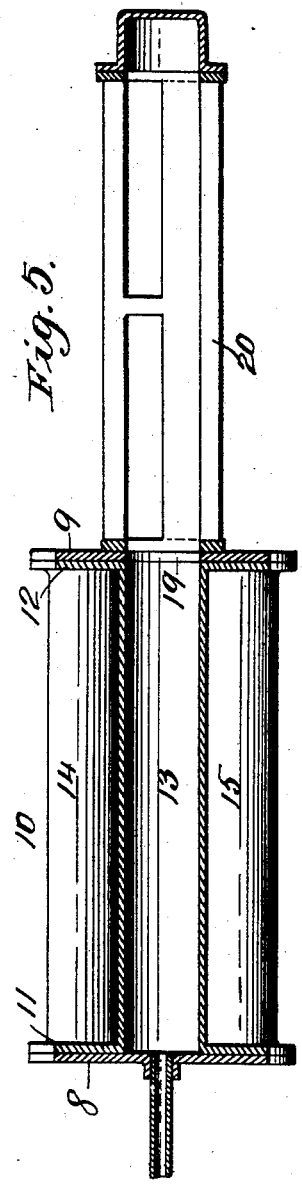
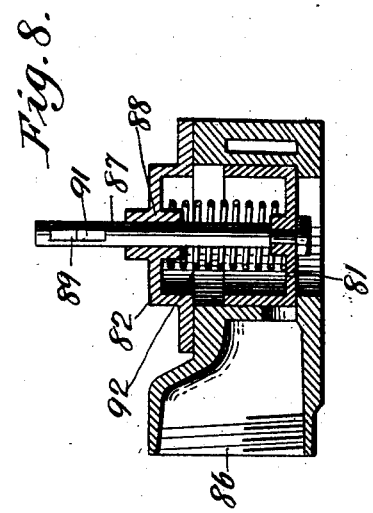
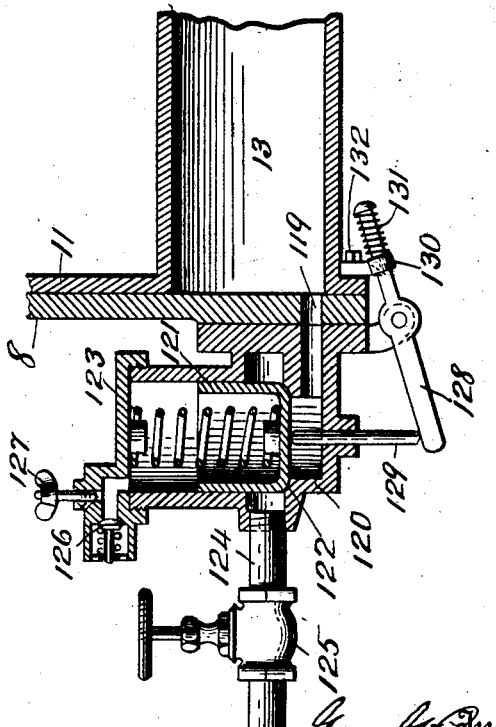

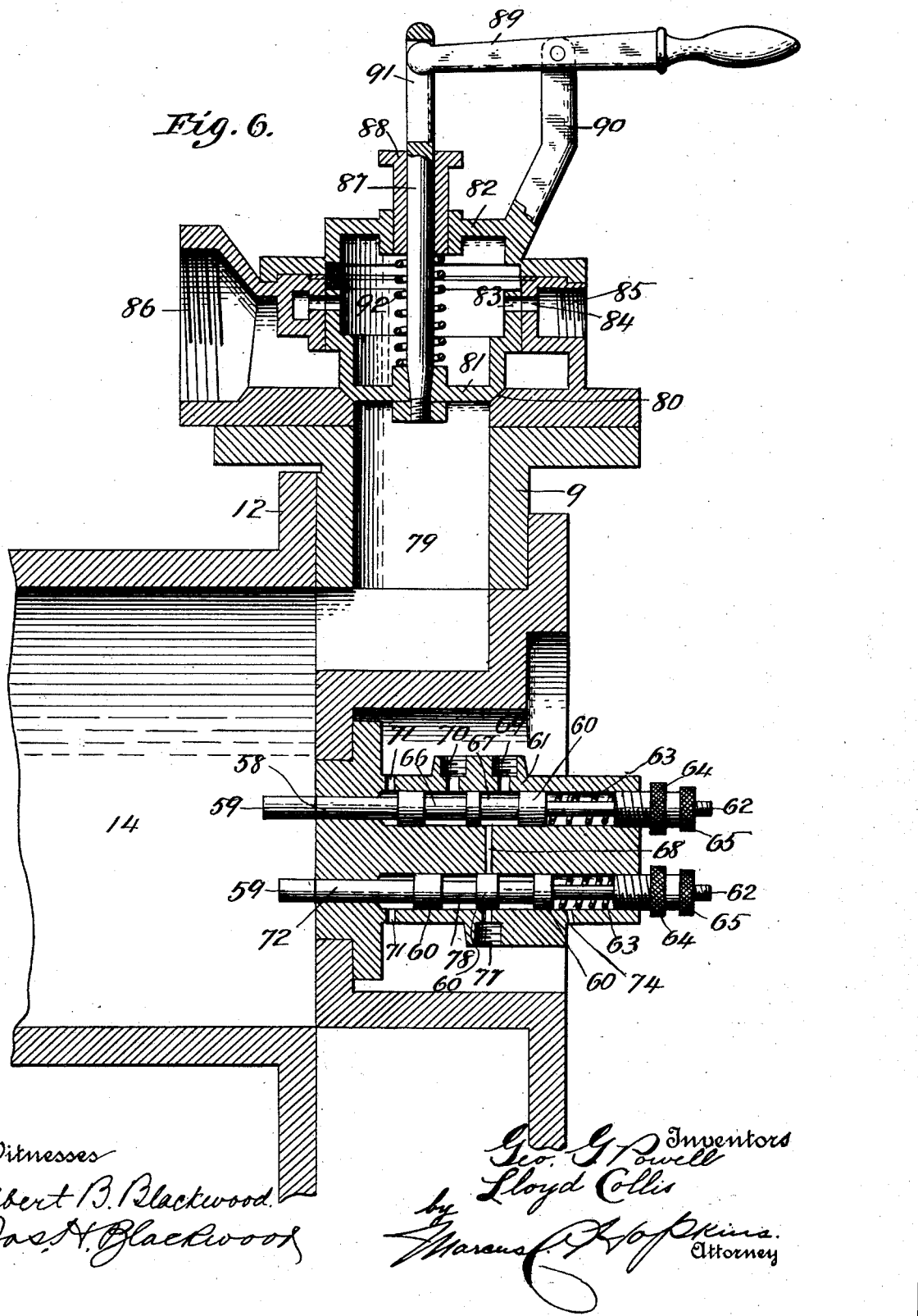

No. 714,865. Patented Dec. 2, 1902.
L. COLLIS & G. G. POWELL.
TUBULAR DESPATCH SYSTEM.
(Application filed Aug. 28, 1901.)

(No Model.) 8 Sheets—Sheet 8.

Witnesses
Albert B. Blackwood.
Jas. H. Blackwood.

Inventors
Geo. G. Powell
Lloyd Collis
by Marcus C. Hopkins
Attorney

UNITED STATES PATENT OFFICE.

LLOYD COLLIS AND GEORGE G. POWELL, OF NEW YORK, N. Y.

TUBULAR DESPATCH SYSTEM.

SPECIFICATION forming part of Letters Patent No. 714,865, dated December 2, 1902.

Application filed August 28, 1901. Serial No. 73,595. (No model.)

*To all whom it may concern:*

Be it known that we, LLOYD COLLIS and GEORGE G. POWELL, citizens of the United States, and residents of New York city, in the State of New York, have invented a new and useful Improvement in Tubular Despatch Systems, of which the following is a specification.

The present invention relates to a pneumatic carrier of that class which comprises a tube or tubes forming a means of communication between two or more stations, and relates more particularly to the carriers and station apparatus by which said carriers are received and sent through the tube.

This invention consists of a single device which embodies means for receiving, automatically distributing, and ejecting carriers either out upon the line or into a suitable receptacle at the station and means whereby a carrier may be initially sent from the station, as well as safety devices for insuring the proper time interval and the proper and positive operation of said device.

The invention resides in the construction of the apparatus and the coöperating form of carrier, which combine to produce a system which is entirely operated by pneumatic power and may therefore be operated from a single source of supply.

The invention also resides in part in the novel valve mechanism and pneumatically-operated coacting appliances for producing the several functions of the device.

The invention also resides in part in the combination of the depressible controlling members and the peculiar conformation of the head or buffer of the carrier.

The objects of this invention are to provide a single device compact and of convenient arrangement of parts which will perform the function automatically of receiving, discriminating between, and ejecting carriers onto the line or upon a station-receptacle, as the case may be, and which is further designed to admit of the sending from the station or carriers upon the line; and a further object of this invention is to provide a device which is entirely operated by pneumatic power and which embodies means by which the several parts can be manually operated should the normal operation of any constituent part be impeded or arrested in an irregular manner from any cause whatever.

A further object is to produce by the varied conformation of the heads of several varieties of carriers a discriminating action upon the controlling means in such manner that the courses of the several varieties may be separately and automatically determined and governed.

The invention consists in the features of novelty which are hereinafter fully described with reference to the accompanying drawings, which are made a part hereof and in which—

Figure 1 is a side elevation of the apparatus; Fig. 2, a plan; Figs. 3ª and 3ᵇ, a longitudinal vertical section on line $x$ $x$ of Fig. 2; Fig. 4, a vertical cross-section on line $y$ $y$ of Fig. 2; Fig. 5, a vertical section on line $z$ $z$ of Fig. 2; Fig. 6, a detail of the valve-fingers and the excess-pressure valves; Fig. 7, a detail of the ejecting blow-out mechanism; Fig. 8, a vertical cross-section of the excess-pressure valve; Figs. 9, 10, 11, 12, 13, 14, and 15, diagrammatic details of the discriminating system, which figures will be described and explained more fully hereinafter; and Fig. 16, a detail of the pin-heads.

Similar reference characters designate similar parts throughout the several views.

Referring to the drawings, 1 is a section of incoming transit-pipe; 2, a lantern-casting therein; 3, ports in said lantern-casting leading to the by-pass 4; 5, ports leading from the by-pass 4 into lantern-casting 6; 7, a section of outgoing transit-pipe forming a continuation of lantern-casting 6; 8, a disk, preferably integral with lantern-casting 2 and by-pass 4; 9, a similar disk, preferably integral with lantern-casting 6 and by-pass 4; 10, a revolving spool pivoted longitudinally between the disks 8 and 9 and provided with disks 11 and 12 at either end thereof, concentric with and adapted to fit closely against the inner surfaces of the disks 8 and 9.

The spool 10 consists of three tubular chambers 13, 14, and 15, which are arranged longitudinally and equidistant from each other between the disks 11 and 12, the chambers 13, 14, and 15 opening at either end through the disks 11 and 12. Assuming the spool 10 at rest, an opening 16 in the disk 8 will register with the chamber 14, forming a continuous passage from the pipe 1 through the lantern-casting 2 into the chamber 14. In this position an opening 17 in the disk 8, registering with the chamber 15, will form communication between the by-pass 4 and the chamber 15, an opening 18 forming a continuous passage from the chamber 15 through the lantern-casting 6 to the outgoing pipe 7, and an opening 19 in the disk 9, registering with the chamber 13, will communicate with the delivery-pan 20. When the spool 10 is turned one-third of a revolution in either direction, the chambers 13, 14, and 15, being equidistant, will register with the openings just mentioned as well as in the first position, all of the chambers being counterparts of one another and arranged concentrically about the axis of the spool.

At three equidistant points upon the disk 11 and in the periphery thereof are disposed notches 21. A locking-pin 22, mounted upon the frame of the machine, is designed to engage one of the notches and lock the spool 10 in a position in which the several openings will exactly register. The locking-pin 22 carries two pistons 23 24, fast on said pin, said piston working in cylinders 25 26, respectively. The locking-pin 22 is provided at its upper end with an annular groove 27, the upper portion of the pin 22 working in a valve-barrel 28, the annular groove 27 designed to open communication between a pipe 29 and a pipe 30 when the pin 22 is in its raised or unlocking position, but closes said communication when the pin 22 is in its lower or locking position. A spring 31 normally tends to cause the pin 22 to assume its locking position. The projecting upper extremity of the pin 22 is provided with a knob 32 to allow of operating said pin by hand when desired.

The axial shaft 33 of the spool 10 is journaled in the disks 8 and 9 and projects some distance to the left. Two sleeves 34 35 are disposed upon the projecting portion of the shaft 33 and are respectively held from rotating thereon by pins 36 37, passing, respectively, through slots 38 39; but owing to the elongation of slots 38 39 the sleeves 34 35 are capable of a limited longitudinal movement. A rod 40 is mounted in a central longitudinal hole in the shaft 33, through which rod 40 the pins 36 and 37 pass. The rod 40 serves to hold the sleeves 34 35 a constant distance apart and also serves to impart a longitudinal movement to said sleeves. Two gear-wheels 41 42 are loosely mounted on the shaft 33 between the sleeves 34 35 and are provided upon their outer side surfaces with oppositely-pitched cams 43. The inner side surfaces of the sleeves 34 35 are provided with oppositely-pitched cams, which are designed to engage those upon the gear-wheels 41 42. The rod 40 is provided with a fast piston 44, working in a cylinder 45, and the projecting extremity of the rod 40 is provided with a knob 46 for hand operation. A spring 47 normally holds the rod 40 in its right-hand position, putting into engagement the cams upon sleeve 34 and gear-wheel 41.

A piston 48, working in a cylinder 49, is rigidly secured to a piston-rod 50. The upper extremity of the piston-rod 50 is provided with a cross-arm 51. At either end of the cross-arm 51 rise perpendicularly racks 52 53, meshing, respectively, upon opposite sides with gear-wheels 41 42. It will be seen that the rise of piston-rod 50, carrying racks 52 53, will rotate the gear-wheels 41 42 in opposite directions. A pilot-valve 54 of the usual pattern is normally held by a spring, (not shown,) admitting air-pressure from any suitable source through a pipe 55 to the upper side of piston 48, holding it in its lower position. A piston fast on the valve-stem of valve 54 (piston and stem not shown) and working in cylinder 56 is designed to throw upon the admission of pressure to cylinder 56 the valve 54 to its opposite position, admitting air-pressure to the under side of piston 48 and raising the same, together with the rod 50 and the racks 52 53. As the rod 50 and the racks 52 53 are raised the gears 41 42 will be rotated in opposite directions, and if no air-pressure is applied to the right-hand side of the piston 44 the spring 47 will cause the sleeve 34 and the cam on its inner face to engage the cam on gear 41, and the spool 10 will be rotated with the gear 41 one-third of a revolution; but if air-pressure is applied to the right-hand side of the piston 44 the cams on sleeve 35 will engage those on gear 42 and the spool 10 will be rotated in the opposite direction with gear 42 one-third of a revolution. As the rod 50 and the racks 52 53 fall the gear-wheels 41 42 will be rotated in their opposite direction. That gear which is in engagement with one of the sleeves will cause its cams to ride over those of its respective sleeve, forcing said sleeve against the action of the spring 47 or the air-pressure in cylinder 45, as the case may be. Air-pressure is supplied to cylinder 56 from pipe 57.

In the disk 9, opposite the opening 16 in the disk 8, a pin 58 is mounted, so as to be concentric with the chamber, which may register with the opening 16. The pin 58 projects into the registering chamber for a short distance and the projecting portion 59 thereof has the form of an arrow-head or is winged upon either side. The construction of the winged heads of the pins 58 and 72 is clearly shown in side and end views. (See Fig. 16.) The pin 58 is preferably formed integral with a valve 60, working in a valve-barrel 61, and also has a projecting portion 62 projecting without the rearward side of the disk 9. The pin 58 is normally held projecting within the registering chamber by a spring 63, the tension of which spring is adjusted by means of the thumb-bushing 64. The outer projecting portion 62 of the pin 58 is provided with a knurled thumb-nut 65, which allows of the manual operation of the pin 58 and also serves to limit the inward movement of said pin. The valve portion 60 of the pin 58 is provided with two annular recesses 66 67. When the pin 58 is in its normal position, projecting within the registering chamber, the recess 67 opens communication between a port 68 and a pipe 69; but when the pin is depressed or thrown to its right-hand position said communication is cut off and communication is established between the port 68 and a pipe 70 through recess 66. A small port 71 is provided to allow of the entrance and exit of air to the forward end of the valve-barrel 61 upon the movement of the valve portion 60. I provide a second pin 72, similar to pin 58, which is mounted in the disk 9 a greater or less distance from the pin 58 or which is entirely omitted, according to the position of the particular machine in the system, which will be fully set forth hereinafter. The valve portion 60 of the pin 72 is provided with one annular recess. When pin 72 is in its normal position, projecting within the registering chamber, communication is cut off between port 68 and a pipe 77 by the valve portion 60; but when the pin is depressed or forced to its right-hand position communication is opened between the port 68 and pipe 77 through the recess 78, which communication is again closed when the pin assumes its normal position.

A port 79 in the disk 9 opens into the registering chamber adjacent the pins 58 72, in which port a valve-seat 80 is constructed, upon which valve-seat a valve 81 is normally seated. The valve 81 is of a cup shape and works in a cylinder 82, and ports 83 in the valve 81 register with ports 84, leading to a pipe 85, when the valve 81 is seated; but communication is closed between said port when the valve is raised. The port 79 communicates through the valve-seat 80 with an exhaust-pipe 86. The valve 81 is provided with a valve-stem 87, projecting through a stuffing-box 88 in the head of the cylinder 82. A lever 89 is journaled upon a bracket 90, projects within a slot 91 in the projecting portion of the valve-stem 87, and serves as a means of hand operation for said valve. The slot 91 is of sufficient length to allow of the raising of valve-stem 87 alone, without encountering the lever 89. A spring 92 normally holds the valve 81 seated upon the valve-seat 80.

A loose valve-piston 98 is disposed within a cylinder 99. The valve-piston 98 is provided with two annular recesses 100 101. The annular recess 100 opens communication between the pipe 29 and a pipe 102 and closes communication between the pipe 29 and a pipe 103 when the valve-piston 98 is in its right-hand position, and the recess 101 opens communication between the pipe 29 and the pipe 103 and communication is closed between the pipe 29 and the pipe 102 when the valve-piston 98 is in its left-hand position. A pipe 104 enters the cylinder 99 at its right-hand end, and a pipe 105 enters said cylinder at its left-hand end. The cylinder 99 is enlarged at its right-hand end, in which enlarged portion of said cylinder works an enlargement of the loose valve-piston 98, which presents a greater area to the pressure from pipe 104 than the left-hand end of the loose valve-piston 98 presents to pressure from pipe 105. This arrangement acts when the same pressure is applied to both pipes 104 and 105 to throw loose valve-piston 98 to its left-hand position, the object of so doing being described hereinafter.

A valve-piston 106 works in a cylinder 107. The valve-piston 106 is provided with two annular recesses 108 and 73. The recess 108 opens communication between the pipe 102 and the pipe 57, and communication is closed between the pipe 102 and a pipe 109, leading to and joining the pipe 104, when the valve-piston 106 is in its lower position, and said recess 108 opens communication between the pipe 102 and the pipe 109, and communication is closed between the pipe 102 and the pipe 57 when the valve-piston 106 is in its upper position. The recess 73 opens communication between a pipe 75, leading from the pipe 30 and a pipe 76, when the valve-piston 106 is in its lower position; but said communication is closed when said valve-piston 106 is raised. A pipe 110 enters the lower end of cylinder 107. The valve-piston 106 is connected to any suitable adjustable time mechanism to regulate the time of the fall thereof, and the recess 108 is of such length that the communication between pipes 102 and 109 is continued throughout the greater portion of the fall of piston 106.

A trip-finger 111 is journaled in the lantern-casting 6 and is designed to open a valve 112 momentarily in the pipe 110 when thrown up by the passage of a carrier in the usual manner, and a spring (not shown) serves to return trip-finger 111 to its normal position, projecting within the line of passage of a carrier after the passage of the same.

A trip-finger 113 is journaled adjacent the outlet 19 onto the pan, projecting into the line of passage of the carriers, which trip-finger 113 upon being thrown to its upper position in either direction operates a valve 114 to cut off communication between a pipe 115 and the pipe 77. A spring (not shown) returns the trip-finger 113 to its normal position. The stem of the valve 114 is provided with a projecting portion and a knob 116 for hand operation, and a spring 117 normally holds said valve 114 in its open or normal position. A cylinder 95 is mounted upon pan-casting 20, (see Fig. 3$^d$,) and a piston 96, carrying a fast locking-pin 97, works therein. The locking-pin 97 is normally held in its left-hand position (see Fig. 3$^d$) by a spring 151, locking trip-finger 113 from being raised to the left, (see Fig. 3$^e$,) and therefore preventing the insertion of a carrier from the pan into the barrel to be sent. The pipe 76, leading from the recess 73 in the time-lock, enters the cylinder 95 at the left of the piston 96, and it will be seen that air-pressure admitted through pipe 76 from the time-lock when the time interval is concluded will withdraw the pin 97 and allow of a carrier being sent; but during the time interval no pressure will be present in pipe 76, and consequently the spring 151 will force the pin 97 to the left, locking the trip-finger 113 and preventing the sending of a carrier out upon the line. A main air-supply pipe 118 supplies air under pressure to pipes 30, 110, and 115.

Opposite the pan-outlet opening 19 a port 119 is provided in the disk 8, which port leads to a valve-casting 120. A valve 121 works in the valve-casting 120 and is normally held seated upon a valve-seat 122 by a spring 123. When the valve 121 is raised, communication is had through the valve-opening 122 between port 119 and a pipe 124. A regulating-valve 125 is placed in the pipe 124. An outflow puppet-valve 126 is placed in the casting 120 above the valve 121, and an adjustable pin-valve 127 is also placed in the casting 120 above the valve 121, forming communication between the chamber above the valve 121 and the atmosphere.

A lever 128 is pivoted upon the casting 120, one end of which lever abuts a loose pin 129, which passes through the casting 120 and abuts valve 121. The opposite end of the lever 128 is provided with a roller 130, which roller is capable of longitudinal as well as rotary movement upon the lever 128, but is normally held in its left-hand position by a spring 131. Three cams 132 are arranged upon the disk 11 in such manner that one of said cams will contact and pass the roller 130 just before one of the chambers of the spool comes into alinement with the port 119 and the pan-exit 19. The cams are so formed with a pitched end surface that when the spool is rotated to the right hand (considered as looked at from the left-hand end) the cams, passing the roller 130, will cause said roller to rise upon and over them, causing the lever 128 to rock and the valve 121 to be raised. The cams 132 upon their opposite ends are provided with a pitched side surface which when the spool is rotated to the left will engage the left-hand side of the roller 130, sliding it out against the compression of spring 131, so as to pass the cam without rocking the lever 128 or opening valve 121. When the valve 121 is raised, the air above the same will be forced out through puppet-valve 126, which will immediately close thereafter and prevent the reëntrance of said air. A small amount of air is slowly admitted through pin-valve 127, which amount may be regulated by said pin-valve to allow the valve 121 to fall with any degree of slowness which may be required. A damper-valve 133 is placed in the by-pass 4 to regulate the amount of air passing therethrough.

Figures 10, 15:
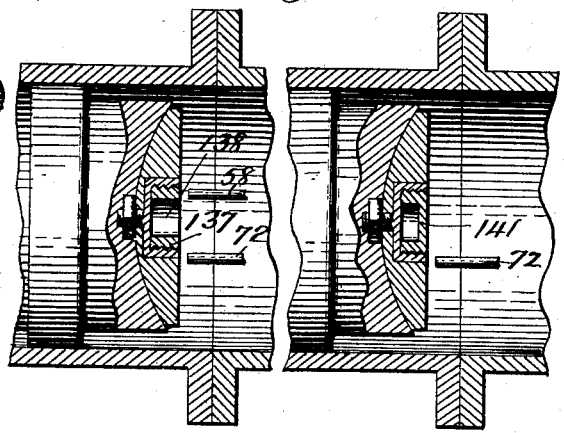
Figure 11:
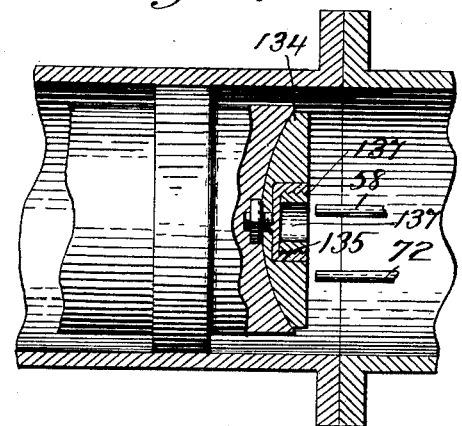
Figure 12:
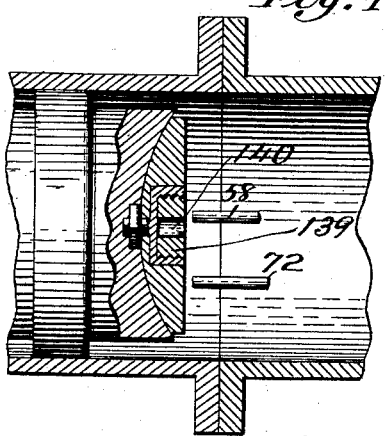
Figure 13:
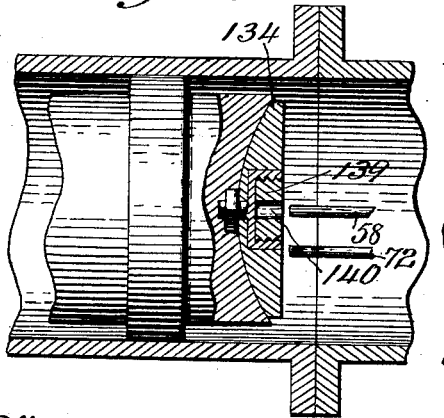
Figure 14:
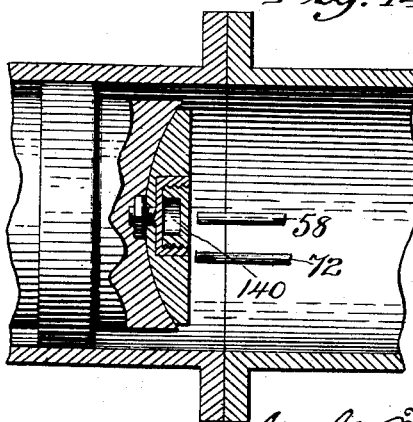

Referring to Fig. 9, we show a carrier forming a part of this device. The buffer end 134 of the carrier is provided with a cup-shaped depression 135, preferably made of metal and secured to the buffer by means of an integral bolt 136. The pins 59 and 72 in the disk 9 are placed in said disk at varying distances apart in the machine at the different stations. Fig. 9 shows the pin 59 in such a position that the carrier reaching the same will not depress it, but the pin 59 will enter the recess 135, close to the edge thereof. The pin 72 in this figure is placed in such a position that the carrier on reaching the same will depress it, the pin 72 not entering the depression 131. This is the construction of the first station out upon the line, and a carrier arranged in this manner entering a machine arranged in this manner will be thrown out at that station. The interior of the depression 135 is preferably provided with an internal thread. The operation of the machine will be hereinafter described, and it suffices to say here that the depression of the pin 72 alone will cause the carrier to be thrown out at that station, and the depression of both pin 59 and pin 72 will cause the carrier to pass through the machine and on to the next station. Now if it is not desired to throw out the carrier at the station illustrated in Fig. 9 the carrier will be provided with a bushing 137, screwed into the depression 135 and having a central aperture 138. Fig. 10 shows a carrier provided with bushing 137 entering the station illustrated in Fig. 9. Here the pin 72 will be depressed as before, and the bushing 137 will depress, also, the pin 59, causing the carrier to pass through the machine without being thrown out. The next station upon the line will be constructed as shown in Fig. 11, and the carrier provided with a bushing 137 will depress the pin 72, but the pin 59 will enter the depression 138 in the bushing and the carrier will be thrown out at that station. Should the carrier be required to go through this station, a thicker bushing 139 would be screwed in the depression 135, which would depress the pin 59 at the station illustrated in Figs. 11 and 12. The bushing 139 is still provided with a small aperture 140, and the station next upon the line would have the pin 59 in such a position that it would enter said aperture 140. When only four stations besides the sending-station are provided upon the line, the several machines will be constructed as we have illustrated; but it will be readily seen that any number of stations may be provided by increasing the number of bushings of different sizes and the number of pins. The carrier provided with bushing 139 would pass through the machine illustrated in Figs. 11 and 12. In Figs. 13 and 14 we have illustrated the construction at the third station beyond the sending-station. In Fig. 15 the last or terminal station is illustrated. Here it is only necessary to provide one pin—pin 72—as the carrier is to be always thrown out.

The operation and pipe connections are as follows: A carrier entering the machine from incoming transit-pipe 1 passes through the lantern-casting 2 and enters chamber 14, producing therein an excess pressure above the normal pressure of the line. The carrier is retarded and brought to rest by the cushioning effect obtained in the closed chamber 14. The excess pressure produced by the cushioning of the carrier in the chamber 14 raises the valve 81. Line-pressure is led to the upper side of the valve 81 through pipe 85 to neutralize the line-pressure within the chamber, and it will be seen, therefore, that the excess pressure will have only to overcome the resistance of the spring 92. As the valve 81 is raised the balance-pressure from pipe 85 is cut off, as the ports 83 84 no longer register, and the line-pressure in chamber 14 will hold valve 81 in its raised position and will pass out through the port 79 and the pipe 86, thereby coaxing the carrier to the right-hand end of the chamber 14. We will consider the machine to be described to be that illustrated in Fig. 9 and the carrier entering to be constructed in the manner of that illustrated in Fig. 9. The carrier approaches the right-hand end of the chamber 14, and the pin 58 being mounted so as to enter the depression 135 will not be depressed; but the pin 72 will be depressed, carrying the valve 60 to the right. The valve 60 being in this position will admit air-pressure from supply-pipe 118 through pipe 115, valve 114, pipe 77, recess 78, port 68, recess 67, pipe 69 to piston 24 in cylinder 26, raising the same, together with the locking-pin 22. When the piston 24 rises, the air will be allowed to pass on through a pipe 104 and check-valve 93 to valve-piston 98, throwing said valve-piston to is left-hand position. At the same time that locking-bolt 22 is raised air-pressure is allowed to flow from supply-pipe 118 through pipe 30 and recess 27 in locking-bolt 22, pipe 29, recess 101 in valve-piston 98, pipe 103 to cylinder 45, throwing piston 44 to its left-hand position. The movement of the piston 44 to its left-hand position carries the sleeve 35 to the left and engages the cams 43 upon the sleeve 35 with the cam upon the gear-wheel 42, disengaging the sleeve 34 with the gear-wheel 41. At the same time that piston 44 is forced to its left-hand position the air-pressure behind the same is allowed to pass on through pipe 57 to cylinder 56, throwing the pilot-valve 54 and admitting air-pressure from pipe 55 to the lower side of the piston 48 in cylinder 49. As the piston 48 rises the rack 53, carried thereby, rotates the gear-wheel 42 to the right as viewed from the left, and as the sleeve 37 is now in engagement with the gear-wheel 42 the shaft 33 and the spool 10 will be rotated to the right, the locking-pin 22 being withdrawn. When the spool 10 begins to rotate, the walls of the recess 135 in the carrier or the wall of the chamber 14 will engage the cam or winged portion 59 of the pin 58, and riding over said cam depress said pin. Air-pressure will then pass, the pin 72 being retained in depressed position, as before, to the port 68, thence through the recess 66 to the pipe 70, and on to the cylinder 25, holding the piston 23 in its raised position, and on through the pipe 105 to the left-hand end of the cylinder 99, throwing the valve-piston 98 to its right-hand position, allowing air-pressure to pass from the pipe 29 through the recess 100 and pipe 102, recess 108 in valve 106, pipe 57 to cylinder 56, retaining pilot-valve 54 in the position to which it was just thrown, continuing the upward movement of the piston 48 and retaining pressure on the left-hand side of the piston 44. When the chamber 14 passes clear of the port 79, the line-pressure no longer holds the valve 81 in its raised position and said valve 81 falls under the influence of spring 92, the ports 83 84 register, and the balance-pressure is resumed. When the chamber 15 arrives at the pins 58 and 72, both of said pins will be released and their springs will project them into the empty chamber 15. The movement of the valve 60 on pin 72 as said pin is projected within the chamber 15 will cut off pressure from pipe 75 and exhaust-cylinder 95 through pipe 73 and port 74, allowing locking-pin 93 to assume its position of readiness. At the same time pressure will be cut off from pipe 77 and the spring 31 will cause locking-pin 22 to bear upon the periphery of disk 11 in a position of readiness to fall into one of the notches 21. While the locking-pin 22 is resting upon the periphery of the disk 11, air-pressure will be continued from pipe 30 through recess 27 in locking-pin 22, pipe 29, recess 100 in valve-piston 98, pipe 102, recess 108 in valve 106, and pipe 57 and be continued in cylinder 56, retaining pilot-valve 54 in the same position, continuing the movement until locking-pin 22 falls into one of the notches 21, when this pressure will be cut off through the recess 27 and pilot-valve allowed to assume its normal position, returning piston 48 to its lower position. The fall of locking-pin 22 into the notch 21 will discontinue the movement of the spool 10 at a point where the chamber 14, containing the carrier, will be in alinement with the opening 19 in the disk 9, leading to the pan 20. Just before the locking-pin 22 falls into the notch 21 one of the cams 132 will contact with the roller 130, the roller 130 riding over the cam, rocking the lever 128 and falling behind the cam 132 before the stoppage of the spool by the fall of the locking-pin 22 into the notch 21. The rocking movement thus imparted to the lever 128 will cause said lever to force up the valve 121 through the medium of the loose pin 129, the air above said valve being forced out of the valve-casing through the puppet-valve 126, which closes upon the discontinuance of the upward movement of the valve. When the valve 121 is in its raised position, air-pressure from pipe 124 passes through the valve-seat opening 122 and the port 119 to the chamber in which the carrier is contained, blowing the carrier out upon the pan through the opening 19 in the disk 9. The fall of the valve 121 is retarded to allow of an extended blow by admitting air above said valve through the adjustable pin-valve 127. The amount of air admitted to the chamber behind the carrier is regulated by valve 125. As the carrier is passing through the opening 19 on to the pan it throws up trip-finger 113, closing valve 114 and cutting off air-pressure from pipe 150, thereby preventing the possible operation of the machine by a subsequent entering carrier and the pinching of the outgoing carrier in the opening 19. This is the cycle performed in the machine in receiving from the line a carrier designed for that station.

The operation of the machine when a carrier is designed to go through—as, for instance, the carrier as constructed in Fig. 10 entering the station shown in Figs. 9 and 10—is as follows: The carrier enters the chamber 14, raises the excess-pressure valve 81, as before, and is coaxed up to the right-hand end. The carrier depresses both pins 58 72, admitting air-pressure to cylinder 95 and releasing valve 81, as before, and admitting air-pressure from pipe 77 through recess 78, port 68, recess 66, pipe 70 to cylinder 25, raising piston 23, with bolt 22, and passing on through pipe 105 to the left-hand end of cylinder 99, forcing valve-piston 98 to its right-hand position. At the same time bolt 22 is raised air-pressure from pipe 30 passes through recess 27, pipe 29, recess 100, pipe 102, recess 108, and pipe 57 to cylinder 56, throwing pilot-valve 54 and causing piston 48 to rise. It will be seen that no pressure has been applied to piston 44 from pipe 103 and said piston still retains its right-hand position because of the pressure of spring 47, augmented by pressure from pipe 57, causing the sleeve 34 to engage by means of its cam the gear-wheel 41. The raising then of the piston 48 and the rack 52 causes the gear-wheel 41 to rotate to the left, and the sleeve 34, in engagement with the gear-wheel 41, will also be rotated to the left, carrying the spool 10. The pins 58 72 will continue depressed by the walls of the chamber 14 and will eventually be projected into the empty chamber 13, when the pressure will be cut off from pipe 77 and locking-bolt 22 will rest upon the periphery of the disk 11, continuing pressure to the pilot-valve 54 until the locking-bolt 22 falls into one of the notches 22, when the movement of the spool will discontinue, as before. The locking-bolt 22 will fall into the notch at a time when the chamber 14, containing the carrier, will be in alinement with the opening 17 in the disk 8 and the opening 18 in the disk 9, leading to the outgoing transit-pipe. The pressure of the line in by-pass 4, passing through opening 17, will blow the carrier through the opening 18, past the ports 5, and out upon the line.

Should the pressure in by-pass 4 not be great enough to blow the carrier out, the damper-valve 133 may be partially or wholly closed for a moment, allowing the line-pressure to build up behind the carrier and blow it out. As the carrier passes out of the spool onto the line beyond it throws up trip-finger 111, which momentarily opens valve 112 and allows a puff of air from pipe 110 to pass to the lower end of cylinder 107 and move valve 106 to its upper position, thus setting the time mechanism. The time mechanism may be set to continue over any desired period of time—we will say ten seconds. If a through-carrier arrives within this time limit, air-pressure through pipe 105 will move valve-piston 98 to its right-hand position and pressure from pipe 29 will pass through recess 100 and pipe 102 to recess 108; but the valve 106 being raised will not allow pressure to pass through pipe 57 to the pilot-valve-operating mechanism, thereby avoiding throwing piston 44 and sending the carrier out onto the line, but will pass to pipe 109, and the right-hand end of piston 98 being of greater area than the left will throw the valve-piston 98 back to its left-hand position, admitting pressure from the pipe 29 through recess 101 and the pipe 103 to the cylinder 45 to throw the piston 44 and eject the carrier onto the pan instead of onto the line beyond.

The operation of sending the carrier is as follows: The carrier is placed upon the pan 20 and pushed through the opening 19 into the chamber 13. As the carrier passes through the opening 19 it raises the trip-finger 113 to the left. The trip-finger 113 when raised to the left closes the valve 114 and prevents all operation of the machine and consequent pinching of the carrier at the opening 19, as in the case where the trip-finger 113 is raised to the right by the exit of the carrier; but the trip-finger when so raised to the left will not return to its normal vertical position, as in the former case, but will remain up holding the valve 114 closed until manually returned to its normal position. This effect is produced because of the spring 94, which returns the trip-finger when the same is raised to the right to its vertical position, only acting in one direction. It is necessary that the operator withdraw the trip-finger to its vertical position by hand before the machine can be operated. This provision is made because the operator necessarily inserts his hand or fingers through the opening 19 in pushing the carrier entirely within the chamber of the spool, and should an entering carrier operate the machine at such a time, the trip-finger 113 having returned automatically and the valve 114 opened, serious injury might be done to the hand and arm of the operator. When the carrier has been entirely inserted in the chamber of the spool and the finger 113 returned to its normal position, it is necessary that the pin 72 be pulled out to cause the operation of the machine in the cycle which has been hereinbefore described upon the receiving of a carrier destined for this station. The spool will rotate one-third of a revolution to the right, and the carrier which was inserted in the chamber registering with the pan-opening 19 will be carried to the line-opening 18 and blown out on the line in the usual manner, operating the time mechanism.

It is obvious that various changes may be made in the details of construction of the several parts of our device without departing from the spirit of our invention.

What we claim, and desire to secure by Letters Patent, is—

1. In tubular despatch apparatus, the combination of a revoluble member, revolving means for said member, chambers in said member parallel to the axis thereof and a controller for said revolving means actuatable from within said chambers.

2. In tubular despatch apparatus, the combination of a revoluble member, revolving means for said member, a chamber in said member parallel to the axis thereof and a controller for said revolving means actuatable from within said chamber.

3. In tubular despatch apparatus, a carrier, a tube, a revoluble series of chambers each capable of forming continuations of said tube, projections variously disposed within said continuation designed to contact with various portions of the surface of the carrier.

4. In tubular despatch apparatus, a series of carriers, a tube, a revoluble series of chambers each capable of forming continuation of said tube, contacting elements variously disposed within said continuation, contacting elements variously disposed on said several carriers designed to contact with the corresponding contacting elements in said continuation.

5. In tubular despatch apparatus, a series of carriers, a tube, a revoluble series of chambers each capable of forming continuation of said tube, contacting elements variously disposed within said continuation, variously-disposed irregularities of the surface of said several carriers designed to contact with the corresponding contacting elements in said continuation.

6. In tubular despatch apparatus, a series of carriers, a tube, a revoluble series of chambers each capable of forming continuation of said tube, contacting elements variously disposed within said continuation, variously-disposed irregularities of the forward surface of said several carriers designed to contact with the corresponding contacting elements in said continuation.

7. In tubular despatch apparatus, a series of carriers, a tube, a revoluble series of chambers each capable of forming continuation of said tube, contacting elements variously disposed within said continuation, variously-disposed circular irregularities of the forward surface of said several carriers designed to contact with the corresponding contacting elements in said continuation.

8. In tubular despatch apparatus, a series of carriers, a tube, a revoluble series of chambers each capable of forming continuation of said tube, contacting elements variously disposed within said continuation, variously-disposed circular irregularities of the forward surface of said several carriers concentric with the axis of the carrier, designed to contact with the corresponding contacting elements in said continuation.

9. In tubular despatch apparatus, a series of carriers, a tube, a revoluble series of chambers each capable of forming continuation of said tube, contacting elements variously disposed within said continuation, variously-disposed circular recesses in the forward surface of said several carriers concentric with the axis of the carriers, designed to register with the corresponding contacting elements in said continuation.

10. In tubular despatch apparatus, a series of carriers, a tube, a revoluble series of chambers each capable of forming continuation of said tube, operating-pins variously disposed within said continuation, contacting elements variously disposed on said several carriers designed to contact with the corresponding operating-pin in said continuation.

11. In tubular despatch apparatus, a series of carriers, a tube, a revoluble series of chambers each capable of forming continuation of said tube, operating-pins variously disposed within said continuation, contacting elements variously disposed on said several carriers designed to contact with the corresponding operating-pin in said continuation.

12. In tubular despatch apparatus, a series of carriers, a tube, a revoluble series of chambers each capable of forming continuation of said tube, depressible pins variously disposed within said continuation, contacting elements variously disposed on said several carriers designed to contact with and depress the corresponding depressible pin in said continuation.

13. In tubular despatch apparatus, a series of carriers, a tube, a revoluble series of chambers each capable of forming continuation of said tube, depressible pins projecting within said continuation, contacting elements variously disposed on said several carriers designed to contact with and depress the corresponding depressible pin in said continuation.

14. In tubular despatch apparatus, a series of carriers, a tube, a revoluble series of chambers each capable of forming continuation of said tube, depressible pins variously disposed within said continuation parallel with the axis of said chamber, contacting elements variously disposed on said several carriers designed to contact with and depress the corresponding depressible pin in said continuation.

15. In tubular despatch apparatus, a series of carriers, a tube, a revoluble series of chambers each capable of forming continuation of said tube, depressible pins variously disposed within said continuation, irregularities variously disposed upon said several carriers designed to contact with and depress the corresponding depressible pin in said continuation.

16. In tubular despatch apparatus, a tube, a chamber forming a continuation of said tube, a wall abutting one end of said chamber, an operating-pin mounted in said wall and a valve integral with and actuated by said pin.

17. In tubular despatch apparatus, a tube, a chamber normally in alinement with and forming a continuation of said tube, means for laterally moving said chamber out of alinement with said tube, a stationary wall normally abutting one end of said chamber, a depressible pin mounted in said wall parallel with the axis of and projecting within said chamber and cam-surfaces upon the projecting portion of said pin to allow of said pin being depressed by the walls of said chamber when said chamber is moved out of alinement with said tube.

18. In tubular despatch apparatus, a projecting operating-pin and cam-surfaces upon the projecting portions of said pin, substantially as and for the purpose set forth.

19. In tubular despatch apparatus, the combination with a carrier, a tube, a pneumatically-operated receiving mechanism and an air-pressure supply, of a receiving-chamber, an operating-pin within said chamber designed to be actuated by a carrier, a normally closed valve integral with and actuated by said operating-pin to open communication between the air-pressure supply and the pneumatic receiving mechanism.

20. In tubular despatch apparatus, the combination with a carrier, a plurality of parallel, revoluble passage-ways and an air-pressure supply, of a passage-selecting mechanism, means for operating said passage-selecting mechanism, pneumatic means for controlling said operating means, a valve mechanism actuated by said carrier to control said pneumatic controlling means.

21. In tubular despatch apparatus, the combination with a carrier, a plurality of passage-ways and an air-pressure supply, of a passage-selecting mechanism, means for operating said passage-selecting mechanism, and a controller for said operating means actuatable by said carrier.

22. In tubular despatch apparatus, a tube, a chamber forming a continuation of said tube, a wall abutting one end of said chamber, an operating-pin mounted in said wall, a valve actuated by said pin, and hand-operating means for said operating-pin.

23. In tubular despatch apparatus, a tube, a chamber forming a continuation of said tube, an air-pressure supply, an abutment at one end of said chamber, a two-way valve, pneumatic mechanism for operating said two-way valve to one position, a second pneumatic mechanism for operating said two-way valve to its other position, means mounted in said abutment controlling said air-pressure to said pneumatic operating mechanisms.

24. In tubular despatch apparatus, a tube, a chamber forming a continuation of said tube, an air-pressure supply, an abutment at one end of said chamber, a pneumatic locking and releasing mechanism, and means mounted in said abutment controlling said air-pressure to said pneumatic locking and releasing mechanism.

25. In tubular despatch apparatus, an air-pressure supply, means for actuating said apparatus, a locking and releasing mechanism for said apparatus, a valve actuated by said locking and releasing mechanism for admitting said air-pressure to said apparatus-actuating means when said locking and releasing mechanism is released and cutting off said air-pressure when said locking and releasing mechanism is locked.

26. In tubular despatch apparatus, an air-pressure supply, means for actuating said apparatus, a locking and releasing mechanism for said apparatus, a valve integral with and actuated by said locking and releasing mechanism for admitting said air-pressure to said apparatus-actuating means when said locking and releasing mechanism is released and cutting off said air-pressure when said locking and releasing mechanism is locked.

27. In tubular despatch apparatus, in combination with a rotary shifting member, a locking-bolt therefor and a valve actuated by said bolt.

28. In tubular despatch apparatus, in combination with a rotary shifting member, a locking-bolt therefor and a valve integral with said bolt and actuated by said bolt.

29. In tubular despatch apparatus, in combination with a rotary shifting member, a locking-bolt therefor, a piston fast on said bolt, a cylinder for said piston, an air-supply inlet in said cylinder to admit air under pressure to withdraw said bolt, and a spring normally tending to maintain said bolt in its locking position.

30. In tubular despatch apparatus, in combination with a rotary shifting member, a locking-bolt therefor, a piston fast on said bolt, a cylinder for said piston, an air-supply inlet in said cylinder to admit air under pressure to withdraw said bolt, an opening in the side of said cylinder designed to be uncovered by said piston to allow of the passage of air from said air-supply inlet when said bolt is withdrawn, and a spring normally tending to maintain said bolt in its locking position.

31. In tubular despatch apparatus, in combination with a rotary shifting member, a locking-bolt therefor, two pistons fast on said bolt, a cylinder for each of said pistons, an air-supply inlet in each of said cylinders to admit air under pressure to withdraw said bolt, an opening in the side of each of said cylinders designed to be uncovered by the respective pistons to allow of the passage of air from said air-supply inlets when said bolt is withdrawn, and a spring normally tending to maintain said bolt in its locking position.

32. In tubular despatch apparatus, a receiving-chamber, operating mechanism for said receiving-chamber, an air-pressure supply, controlling mechanism for said receiving-chamber-operating mechanism, a locking and releasing mechanism controlling said receiving-chamber-operating-mechanism-controlling mechanism and said air-supply, and means in said receiving-chamber for controlling the said locking and releasing mechanism and said receiving-chamber-operating-mechanism-controlling mechanism.

33. In tubular despatch apparatus, a revoluble receiving member having a plurality of parallel chambers, means for operating said receiving member, means for locking and releasing said receiving member, and means controlling said means to simultaneously release and operate said receiving member.

34. In tubular despatch apparatus, a receiving member, having a plurality of parallel chambers, a carrier, means for operating said receiving member, a bolt for locking and releasing said receiving member, a pin designed to be operated by the carrier for simultaneously releasing and operating said member.

35. In tubular despatch apparatus, a carrier, a revoluble receiving member, a reversing mechanism for said receiving member, means for revolving said receiving member, and means operated by said carrier for consecutively controlling said reversing-clutch and operating means.

36. In tubular despatch apparatus, an incoming tube, an outgoing tube, and a station discharge-opening, and a revoluble barrel having chambers, said chambers designed to register simultaneously with said tubes and discharge-opening.

37. In tubular despatch apparatus, an incoming tube, an outgoing tube, and a station discharge-opening, and a revoluble barrel having equidistant chambers, said chambers designed to simultaneously register with said tubes and discharge-opening.

38. In tubular despatch apparatus, an incoming tube, an outgoing tube, and a station discharge-opening, and a revoluble barrel having equidistant chambers, said incoming tube, outgoing tube and discharge-opening each designed to register with a separate one of said chambers simultaneously.

39. In tubular despatch apparatus, a spool having chambers therein, said spool rotatable upon an axis, a frame in which said spool is axially mounted, an incoming tube situated in said frame to register with each of said chambers at different points in the revolution of said spool, means for rotating said spool and a controlling mechanism for said spool-rotating means, said controlling mechanism mounted in said frame to register with one of said chambers simultaneously with the registering of said chamber with said incoming tube.

40. In tubular despatch apparatus, a barrel having chambers therein, and means for rotating said barrel in either direction.

41. In tubular despatch apparatus, a rotatable receiving and sending barrel, chambers in said barrel, an individual chamber designed to register with an incoming tube, simultaneously with the registering of other and separate chambers with an outgoing tube and a station discharge-opening.

42. The combination with a despatch-tube and a carrier adapted to travel therein, of a rotatable barrel having chambers parallel to the axis of rotation thereof, said chambers capable of forming continuation of said tube and automatic mechanism for rotating said barrel controlled by the entrance into one of said chambers of a carrier from said tube.

43. The combination with a despatch-tube and a carrier adapted to travel therein, of a rotatable chambered receptacle located intermediate the terminals of said despatch-tube and adapted to receive the carrier and pass the same to the tube beyond or out at a station discharge, said disposition dependent upon the conformation of said carrier.

44. In an intermediate receiver and sender for tubular despatch systems, a rotatable member, a series of receptacles in said rotatable member, means for rotating said rotatable member, means for determining the direction of rotation and means actuated by the entrance of a carrier to control the rotating and direction-determining means.

45. In tubular despatch apparatus, a rotary shifting member, means for rotating said member, and mechanism for determining the direction of rotation of said member.

46. In tubular despatch apparatus, a rotary shifting member, means for rotating said member, and a clutch mechanism for determining the direction of rotation of said member.

47. In tubular despatch apparatus, a rotary shifting member, pneumatic means for rotating said member, and mechanism for determining the direction of rotation of said member.

48. In tubular despatch apparatus, a rotary shifting member, means for rotating said member, a clutch mechanism for determining the direction of rotation of said member and pneumatic means for actuating said clutch mechanism.

49. In tubular despatch apparatus, a rotary shifting member, a shaft therefor, two gear-wheels loosely mounted upon said shaft, oppositely-pitched cams upon said respective gear-wheels, a sleeve mounted to rotate with said shaft and capable of longitudinal movement thereon, oppositely-pitched sets of cams upon said sleeve adapted to alternately mesh with the cams on said gear-wheels, means for moving said sleeve longitudinally upon said shaft, and means for rotating said gear-wheels in opposite directions.

50. In tubular despatch apparatus, a rotary shifting member, a shaft therefor, oppositely-rotatable clutch members loosely mounted upon said shaft, a fast clutch member rotatable with said shaft and capable of longitudinal movement thereon, and means for moving said fast clutch member consisting of a piston connected with said fast clutch member working in a cylinder.

51. In tubular despatch apparatus, in combination with a clutch member, a clutch-member-moving mechanism consisting of a piston, a piston-rod connecting said clutch member and piston, a cylinder for said piston, an air-pressure inlet at one end of said cylinder to admit air to move said piston in one direction and a spring to return said piston.

52. In tubular despatch apparatus, in combination with a movable clutch member, a piston, a piston-rod connecting said piston and clutch member, a cylinder for said piston, an air-supply opening at one end of said cylinder for admitting air under pressure to move said piston in one direction, an opening in the side of said cylinder designed to be uncovered by said piston at the end of its stroke and permit air from said air-supply opening to pass through said opening, and a spring to return said piston.

53. In tubular despatch apparatus, in combination with a rotary shifting member, a plurality of longitudinal equidistant receiving-chambers in said member, a stationary frame abutting both ends of said member, an incoming-tube terminal in said frame designed to register with one end of one of said receiving-chambers, operating mechanism in said frame opposite said incoming-tube terminal designed to register with the other end of the same receiving-chamber simultaneously with said incoming-tube terminal, a discharge-opening in said frame designed to register with one end of a second of said receiving-chambers, a blow-out mechanism in said frame opposite said discharge-opening designed to register with the other end of said second receiving-chamber, an outgoing-tube terminal in said frame designed to register with one end of a third receiving-chamber, a by-pass from said incoming to said outgoing tube and a port in said frame leading to said by-pass designed to register with the other end of said third receiving-chamber simultaneously with said discharge-opening.

54. In tubular despatch apparatus, the combination with an incoming tube, an outgoing tube and a station discharge, of a carrier, a revoluble shifting member having a plurality of parallel chambers, means for actuating said shifting member, a source of potential energy, two controlling members designed to be operated by the carrier, the operation of one of said controlling members causing said shifting member to deliver the carrier from any one of said chambers to said station discharge and the operation of both of said controlling members causing said shifting member to deliver the carrier from any one of said chambers to said outgoing tube.

55. In tubular despatch apparatus, a carrier, a receiving member, mechanism for revolving said receiving member in one direction, means for revolving said receiving member in the opposite direction, and means for operating said revolving mechanisms.

56. In tubular despatch apparatus, a carrier, a receiving member, locking and releasing means for said member, mechanism for revolving said receiving member in one direction, mechanism for revolving said member in the opposite direction, and means for operating said revolving mechanisms.

57. In tubular despatch apparatus, a revoluble receiving member, revolving means therefor, controlling means for said revolving means, a two-way valve, a reversing mechanism for said revoluble member, one way of said valve actuating the controlling means for said revolving means, the other way of said valve actuating the reversing mechanism and said reversing mechanism controlling the controlling means for said revolving means.

58. In tubular despatch apparatus, a tube, a cushioning chamber forming a continuation of said tube, means within said chamber farthest from said tube designed to be contacted by said carrier, and a valve in said chamber adjacent said means operated by the excess pressure in advance of an entering carrier to exhaust the air in advance of said entering carrier to cause the same to approach said means.

59. In tubular despatch apparatus, an initial operating air-pressure supply, a normally open valve in said air-pressure supply designed to be closed during the passage of a carrier into or out of said apparatus.

60. In tubular despatch apparatus, a movable member operated by an air-pressure supply, a normally open valve in said air-pressure supply, means actuated by the passage of a carrier into or out of said movable member designed to close said valve.

61. In tubular despatch apparatus, an initial operating air-pressure supply, a movable member operated by said air-pressure supply, a normally open valve in said air-pressure supply, a trip-finger actuated by the passage of a carrier into or out of said movable member designed to close said valve.

62. In tubular despatch apparatus, an initial operating air-pressure supply, a movable member operated by said air-pressure supply, a normally open valve in said air-pressure supply, a trip-finger actuated by the passage of a carrier into or out of said movable member, designed to close said valve, and means for returning said trip-finger and valve to their normal positions after such passage of the carrier.

63. In tubular despatch apparatus, an initial operating air-pressure supply, a movable member operated by said air-pressure supply, a normally open valve in said air-pressure supply, a trip-finger actuated by the passage of a carrier into or out of said movable member, designed to close said valve, and a spring for returning said trip-finger and valve after the passage outward of a carrier.

64. In tubular despatch apparatus, an initial operating air-pressure supply, a movable member operated by said air-pressure supply, a normally open valve in said air-pressure supply, a trip-finger actuated by the passage of a carrier into or out of said movable member, designed to close said valve, and a spring for returning said trip-finger and valve after the passage outward of a carrier, means retaining said valve closed after the passage inward of the carrier, and manual opening means for said valve.

65. In tubular despatch apparatus an initial operating air-pressure supply a normally open valve in said air-pressure supply, a trip-finger provided with a cam designed to close said valve, said trip-finger designed to be actuated by the passage of a carrier, and means for returning said trip-finger and valve to their normal positions.

66. In tubular despatch apparatus, an initial operating air-pressure supply, a normally open valve in said air-pressure supply, a trip-finger provided with cams designed to close said valve, said trip-finger designed to be actuated by the passage of a carrier, and means for returning said trip-finger when actuated by the passage of a carrier in one direction only.

67. In tubular despatch apparatus, a sending-aperture, a time-lock mechanism, and means adjacent said sending-aperture designed to be normally moved from the path of the carrier by the carrier but rendered rigid preventing the insertion of a carrier by and during the operation of said time-lock mechanism.

68. In tubular despatch apparatus, a sending-aperture, a time-lock mechanism, an air-pressure supply, and a trip-finger adjacent said sending-aperture, designed to be moved out of the path of a carrier by the carrier, pneumatic means for preventing such movement of said finger and consequent sending of said carrier, air-pressure to said pneumatic means controlled by said time-lock mechanism.

69. In tubular despatch apparatus, a sending-aperture, a time-lock mechanism, an air-pressure supply, and a trip-finger adjacent said sending-aperture, designed to be moved out of the path of a carrier by the carrier, and means designed to lock said trip-finger during the operation of the said time-lock mechanism.

70. In tubular despatch apparatus, a sending-aperture, a time-lock mechanism, an air-pressure supply, and a trip-finger adjacent said sending-aperture, designed to be moved out of the path of a carrier by the carrier, a spring-pressed pin designed to lock said finger and prevent such movement and pneumatic means controlled by said time-lock mechanism for retracting said pin and releasing said finger.

71. In tubular despatch apparatus, an air-pressure supply a movable member, a discharging-chamber, a normally closed valve in said air-supply for admitting pressure to said discharge-chamber, means upon said movable member for opening said valve and automatic means for determining the open interval of and closing said valve.

72. In tubular despatch apparatus, an air-pressure supply a movable member, a discharging-chamber, a normally closed valve in said air-supply for admitting pressure to said discharge-chamber, cams upon said movable member for opening said valve and automatic means for determining the open interval of and closing said valve.

73. In tubular despatch apparatus, an air-pressure supply a movable member, a discharging-chamber, a normally closed valve in said air-supply for admitting pressure to said discharge-chamber, cams upon said movable member for raising said valve and retarding means determining the interval of fall and closure of said valve.

74. In tubular despatch apparatus, an air-pressure supply a movable member, a discharging-chamber, a normally closed valve in said air-supply for admitting pressure to said discharging-chamber, cams upon said movable member for raising said valve, a closed chamber above said valve, a check-valve to allow air to pass from said closed chamber upon the raising of said normally closed valves, and a pin-valve to allow of the gradual return to said closed chamber of air and the consequent fall of said normally closed valve.

75. In tubular despatch apparatus, an air-pressure supply a movable member, a discharging-chamber, a normally closed valve in said air-supply for admitting pressure to said discharging-chamber, cams upon said movable member for raising said valve, a closed chamber above said valve, a check-valve to allow air to pass from said closed chamber upon the raising of said normally closed valves, and a pin-valve to allow of the gradual return to said closed chamber of air and the consequent fall of said normally closed valve, and a spring to compel the fall of said normally closed valve.

76. In a tubular despatch apparatus an oppositely-revoluble member, a valve, means upon said revoluble member to operate said valve upon movement of said revoluble member in one direction only.

77. In a tubular despatch apparatus, an oppositely-movable member, a valve, a cam upon said movable member, a lever designed to ride said cam to actuate said valve upon movement of said movable member in one direction only.

78. In a tubular despatch apparatus, an oppositely-movable member, a valve, a lever for operating said valve provided with longitudinal movable roller, a cam on said movable member, a horizontal face upon one end of said cam upon which said roller is designed to ride to actuate said lever upon the movement of said movable member in one direction, and a vertical face upon the opposite end of said cam designed to longitudinally move said roller upon said lever to avoid actuating said lever upon the movement of said movable member in the opposite direction.

79. In a tubular despatch apparatus, an oppositely-movable member, a valve, a lever for operating said valve provided with longitudinal movable roller, a cam on said movable member, a horizontal face upon one end of said cam upon which said roller is designed to ride to actuate said lever upon the movement of said movable member in one direction, and a vertical face upon the opposite end of said cam designed to longitudinally move said roller upon said lever to avoid actuating said lever upon the movement of said movable member in the opposite direction, and a spring for normally retaining said roller in alinement with said cam.

In testimony whereof we have signed our names to this specification in the presence of two subscribing witnesses.

LLOYD COLLIS.
GEORGE G. POWELL.

Witnesses:
W. H. ROGERS,
S. B. ROBERTSON.